(12) United States Patent
Sugihara et al.

(10) Patent No.: US 10,886,522 B2
(45) Date of Patent: Jan. 5, 2021

(54) METHOD OF PRODUCING NON-AQUEOUS ELECTROLYTE SECONDARY BATTERY

(71) Applicant: Toyota Jidosha Kabushiki Kaisha, Toyota (JP)

(72) Inventors: Atsushi Sugihara, Toyota (JP); Naoto Onodera, Hirakata (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 43 days.

(21) Appl. No.: 16/195,183

(22) Filed: Nov. 19, 2018

(65) Prior Publication Data
US 2019/0165359 A1 May 30, 2019

(30) Foreign Application Priority Data
Nov. 27, 2017 (JP) ................................ 2017-226999

(51) Int. Cl.
| | |
|---|---|
| *H01M 4/04* | (2006.01) |
| *H01M 10/0565* | (2010.01) |
| *H01M 10/0587* | (2010.01) |
| *H01M 2/16* | (2006.01) |
| *H01M 10/05* | (2010.01) |
| *H01M 10/44* | (2006.01) |

(52) U.S. Cl.
CPC ....... *H01M 4/0447* (2013.01); *H01M 2/1653* (2013.01); *H01M 10/05* (2013.01); *H01M 10/0565* (2013.01); *H01M 10/0587* (2013.01); *H01M 10/446* (2013.01); *H01M 2300/0085* (2013.01); *H01M 2300/0088* (2013.01)

(58) Field of Classification Search
CPC ............. H01M 10/05; H01M 10/0565; H01M 10/0587; H01M 10/446; H01M 2300/0085; H01M 2300/0088; H01M 2/1653; H01M 4/0447
See application file for complete search history.

(56) References Cited

U.S. PATENT DOCUMENTS

2011/0287305 A1* 11/2011 Scordilis-Kelley ........................ H01M 10/052
429/163
2016/0261006 A1* 9/2016 Ueno .................. H01M 4/1391

FOREIGN PATENT DOCUMENTS

| JP | H10214638 A | 8/1998 |
|---|---|---|
| JP | 2011-108550 A | 6/2011 |
| KR | 1020150009911 A | 1/2015 |

* cited by examiner

*Primary Examiner* — Adam A Arciero
(74) *Attorney, Agent, or Firm* — Dinsmore & Shohl LLP

(57) ABSTRACT

A method of producing a non-aqueous electrolyte secondary battery includes at least the following ($\alpha$), ($\beta$), and ($\delta$): ($\alpha$) preparing an elementary battery including at least a positive electrode, a negative electrode, a gel film, and an electrolyte solution; ($\beta$) carrying out initial charge of the elementary battery; and ($\delta$) after the initial charge, processing the elementary battery to produce a finished-product battery. The negative electrode includes at least a negative electrode active material. The gel film is formed on a surface of the negative electrode. The gel film contains a polymer material and the electrolyte solution. The gel film is thixotropic. The initial charge is carried out while the gel film is under a first pressure. The processing is carried out in such a way that the gel film is put under a second pressure. The second pressure is higher than the first pressure.

8 Claims, 11 Drawing Sheets

METHOD OF PRODUCING NON-AQUEOUS ELECTROLYTE SECONDARY BATTERY

CROSS REFERENCE TO RELATED APPLICATIONS

This nonprovisional application claims priority to Japanese Patent Application No. 2017-226999 filed on Nov. 27, 2017 with the Japan Patent Office, the entire contents of which are hereby incorporated by reference.

BACKGROUND

Field

The present disclosure relates to a method of producing a non-aqueous electrolyte secondary battery.

Description of the Background Art

Japanese Patent Laying-Open No. 2011-108550 discloses a method of initial charge of a non-aqueous electrolyte secondary battery.

SUMMARY

It is considered that during initial charge of a non-aqueous electrolyte secondary battery, a film is formed at an interface between the negative electrode (solid) and the electrolyte solution (electrolyte), more specifically a solid electrolyte interface (SEI) film is formed on the surface of the negative electrode. It is considered that the formation of the SEI film prevents the surface of the negative electrode from changing upon reduction of the electrolyte solution. It is considered that because the change is thus prevented, reduction and degradation reaction of the electrolyte solution is less likely to occur and, consequently, charge and discharge can be repeated.

However, the SE film can also prevent movement of charge carriers (carrier ions). Therefore, it is considered that at a surface with a thick SEI film formed thereon, for example, charge-discharge reaction proceeds relatively slowly, while at a surface with a thin SEI film formed thereon, charge-discharge reaction proceeds relatively quickly. It is also considered that if the SEI film is irregular in its shape and/or composition, the charge-discharge reaction proceeds in an irregular fashion. It is considered that this irregular charge-discharge reaction allows local degradation to proceed and then cycle capacity retention to decrease. On the contrary, if the SET film is uniform, improvement in cycle capacity retention is expected to be obtained.

Japanese Patent Laying-Open No. 2011-108550 discloses that multi-step initial charge allows formation of a stable SET film. Such multi-step charge, however, can require a complex control of the process.

An object of the present disclosure is to improve cycle capacity retention without a complex charge control.

In the following, the technical structure and the effects according to the present disclosure are described. It should be noted that part of the action mechanism according to the present disclosure is based on presumption. Therefore, the scope of claims should not be limited by whether or not the action mechanism is correct.

[1] A method of producing a non-aqueous electrolyte secondary battery according to the present disclosure includes at least the following (α), (β), and (δ):

(α) preparing an elementary battery including at least a positive electrode, a negative electrode, a gel film, and an electrolyte solution;

(β) carrying out initial charge of the elementary battery; and (δ) after the initial charge, processing the elementary battery to produce a finished-product battery.

The negative electrode includes at least a negative electrode active material. The gel film is formed on a surface of the negative electrode. The gel film contains a polymer material and the electrolyte solution. The gel film is thixotropic. The initial charge is carried out while the gel film is under a first pressure. The processing of the elementary battery is carried out in such a way that the gel film is put under a second pressure. The second pressure is higher than the first pressure.

FIG. 1 is a first conceptual view that illustrates an action mechanism according to the present disclosure.

During initial charge, charge carriers that are present in the electrolyte solution in a distance from a surface of negative electrode 20 move toward the surface. The charge carriers are solvated in a solvent of the electrolyte solution. It is considered that part of the solvent that has reached the surface of negative electrode 20 together with the charge carriers is reduced and degraded to form an SEI film 1. It is considered that the surface of negative electrode 20 has microscopic irregularities and/or irregular compositions, for example. It is considered that the charge carriers converge to an area of the surface of negative electrode 20 protruding from the surrounding surface, for example. It is considered that this phenomenon makes SEI film 1 irregular in shape and/or composition.

FIG. 2 is a second conceptual view that illustrates the action mechanism according to the present disclosure.

A gel film 40 is formed on a surface of negative electrode 20. Gel film 40 is thixotropic. Being "thixotropic" herein refers to having a property of becoming less viscous as the applied pressure increases.

It is considered that during initial charge, charge carriers pass through gel film 40 and reach a surface of negative electrode 20. Gel film 40 contains a polymer material and the electrolyte solution. It is considered that the viscosity of gel film 40 is higher than the viscosity of the electrolyte solution alone. Having a higher viscosity is considered to be having a higher resistance to the movement of charge carriers. Therefore, it is considered that the velocity of the charge carriers moving within gel film 40 is lower than the velocity thereof moving on the outside of gel film 40. It is considered that if the velocity of the charge carriers reaching a surface of negative electrode 20 decreases, the velocity of reaction of forming SEI film 1 decreases as well. It is considered that as a result of these phenomena, a uniform SEI film 1 can be formed despite any microscopic irregularity or irregular composition, for example, of a surface of negative electrode 20.

Gel film 40 can also decrease the velocity of movement of charge carriers during normal use of the elementary battery. To deal with this problem, the present disclosure takes advantage of the thixotropic properties of gel film 40.

FIG. 3 is a third conceptual view that illustrates the action mechanism according to the present disclosure.

According to the present disclosure, the elementary battery after initial charge is processed m such a way that gel film 40 is put under a pressure (second pressure in FIG. 2) higher than the pressure applied during initial charge (first pressure in FIG. 2). Thus, the finished-product battery is produced. It is considered that the viscosity of gel film 40 in the finished-product battery decreases as the applied pressure increases. The reason is because gel film 40 is thixotropic as described above. It is expected that as the viscosity decreases, the velocity of the charge carriers moving within gel film 40 increases. In other words, it is expected that an increase in resistance caused by placement of gel film 40 is inhibited.

Examples of the processing carried out for putting gel film 40 under the second pressure are considered to be a processing to depress a casing of the elementary battery and a processing to equip the elementary battery with a component for applying pressure to gel film 40.

Thus, it is considered that according to the present disclosure, the velocity of reaction of forming SEI film 1 during initial charge is controlled by the presence of gel film 40 and consequently no complex charge control is required. In other words, it is considered that the present disclosure can improve cycle capacity retention without any complex charge control.

[2] The initial charge may be carried out while the elementary battery is cooled.

It is expected that cooling the elementary battery further decreases the velocity of the charge carriers moving within gel film 40. It is then expected that the cycle capacity retention is improved.

[3] A dispersion containing the polymer material in an amount of 0.5 mass % with the remainder being made up of a solvent may satisfy the following relationship:

$$(\eta a/\eta b) \geq 4.0$$

(where each of $\eta a$ and $\eta b$ is a viscosity measured with a B type viscometer at 25° C.; $\eta a$ is a viscosity measured at a rotational speed of 10 rpm; and $\eta b$ is a viscosity measured at a rotational speed of 100 rpm).

The "$\eta a/\eta b$" is an index of thixotropy. Hereinafter, the "$\eta a/\eta b$" is also called TI (thixotropy index) value. A high TI value means that the degree of viscosity decrease is great relative to the degree of pressure increase. It is expected that when the TI value is not lower than 4.0, the cycle capacity retention is improved and an increase in battery resistance is inhibited.

[4] The polymer material may be at least one selected from the group consisting of hydroxypropyl xanthan gum (HPXG), hydrophobically-modified hydroxypropyl methylcellulose (HM-HPMC), and hydroxypropyl guar gum (HPGG).

A dispersion of such a polymer material or materials can have a high TI value. Therefore, it is expected that the use of such a polymer material or materials improves the cycle capacity retention and inhibits an increase in battery resistance.

Herein, the "HM-HPMC" refers to an HPMC in which part of the hydroxy groups or all of the hydroxy groups has/have hydrophobic group introduction. Examples of the hydrophobic group are considered to be long-chain alkyl groups containing 10 or more carbon atoms.

[5] The content of the polymer material may be not lower than 0.1 part by mass and not higher than 0.7 part by mass relative to 100 parts by mass of the negative electrode active material.

When the content is within this range, an improved balance is expected to be obtained between the battery resistance and the cycle capacity retention.

The foregoing and other objects, features, aspects and advantages of the present disclosure will become more apparent from the following detailed description of the present disclosure when taken in conjunction with the accompanying drawings.

DESCRIPTION OF THE EMBODIMENTS

In the following, embodiments according to the present disclosure (herein called "present embodiment") are described. The scope of claims is not limited to the following description. For example, while the following description describes a lithium-ion secondary battery, a non-aqueous electrolyte secondary battery according to the present embodiment is not limited to a lithium-ion secondary battery. The non-aqueous electrolyte secondary battery according to the present embodiment can be a sodium-ion secondary battery, for example.

<Method of Producing Non-Aqueous Electrolyte Secondary Battery>

Figure 1:
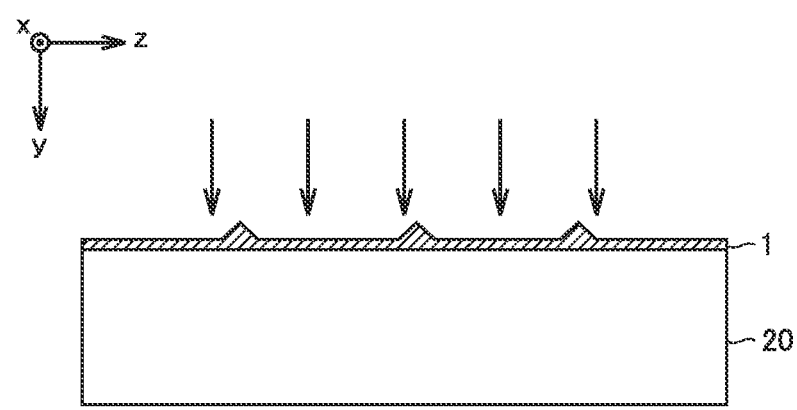
FIG. 1 is a first conceptual view that illustrates the action mechanism according to the present disclosure.
Figure 2:
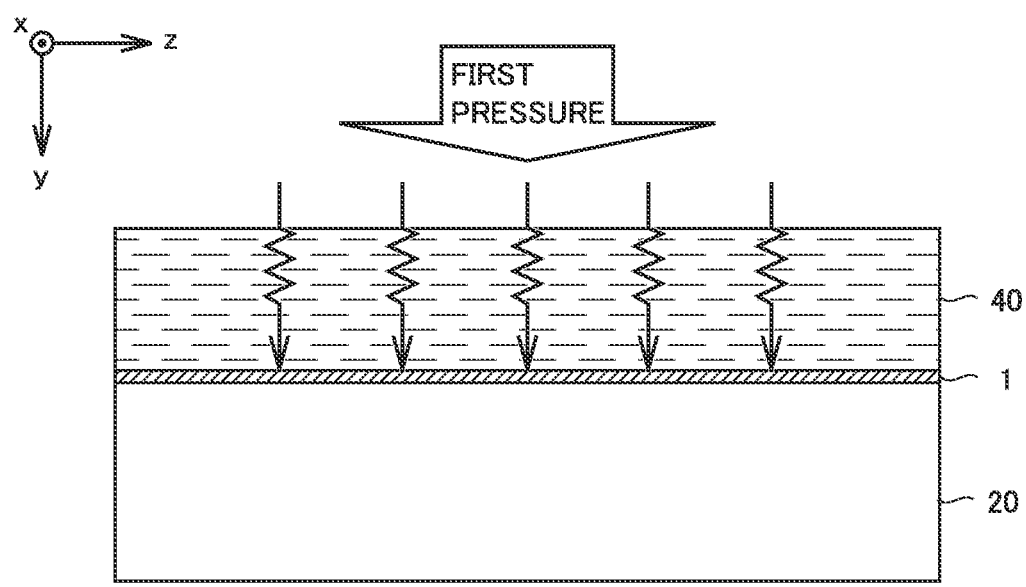
FIG. 2 is a second conceptual view that illustrates the action mechanism according to the present disclosure.
Figure 3:
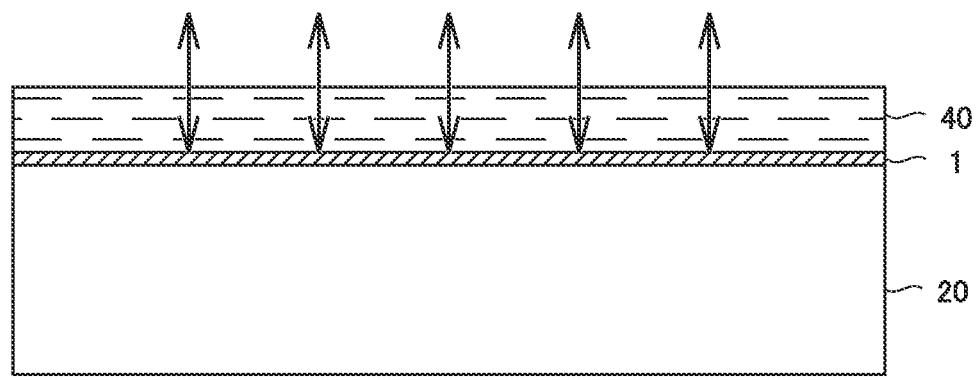
FIG. 3 is a third conceptual view that illustrates the action mechanism according to the present disclosure.
Figure 4:
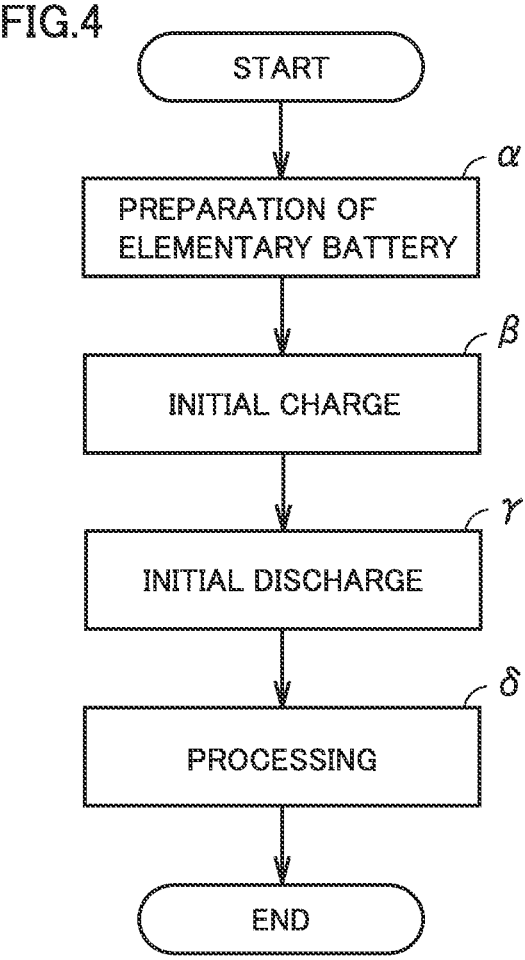
FIG. 4 is a flow chart schematically showing the method of producing a non-aqueous electrolyte secondary battery according to the present embodiment.

FIG. 4 is a flow chart schematically showing a method of producing a non-aqueous electrolyte secondary battery according to the present embodiment. The method of producing a non-aqueous electrolyte secondary battery according to the present embodiment includes at least "(α) preparation of an elementary battery", "(β) initial charge", and "(δ) processing". In the method of producing a non-aqueous electrolyte secondary battery according to the present embodiment, "(γ) initial discharge" may be included between "(β) initial charge" and "(δ) processing". "(γ) Initial discharge" may be carried out after "(δ) processing".

Herein, a non-aqueous electrolyte secondary battery before undergoing "(β) initial charge" and "(δ) processing" is called "elementary battery", and a non-aqueous electrolyte secondary battery (final product) after undergoing "(β) initial charge" and "(δ) processing" is called "finished-product battery".

<<(α) Preparation of Elementary Battery>>

The method of producing a non-aqueous electrolyte secondary battery according to the present embodiment includes preparing an elementary battery 100 that includes at least a positive electrode 10, a negative electrode 20, a gel film 40, and an electrolyte solution.

(Elementary Battery)

Figure 5:
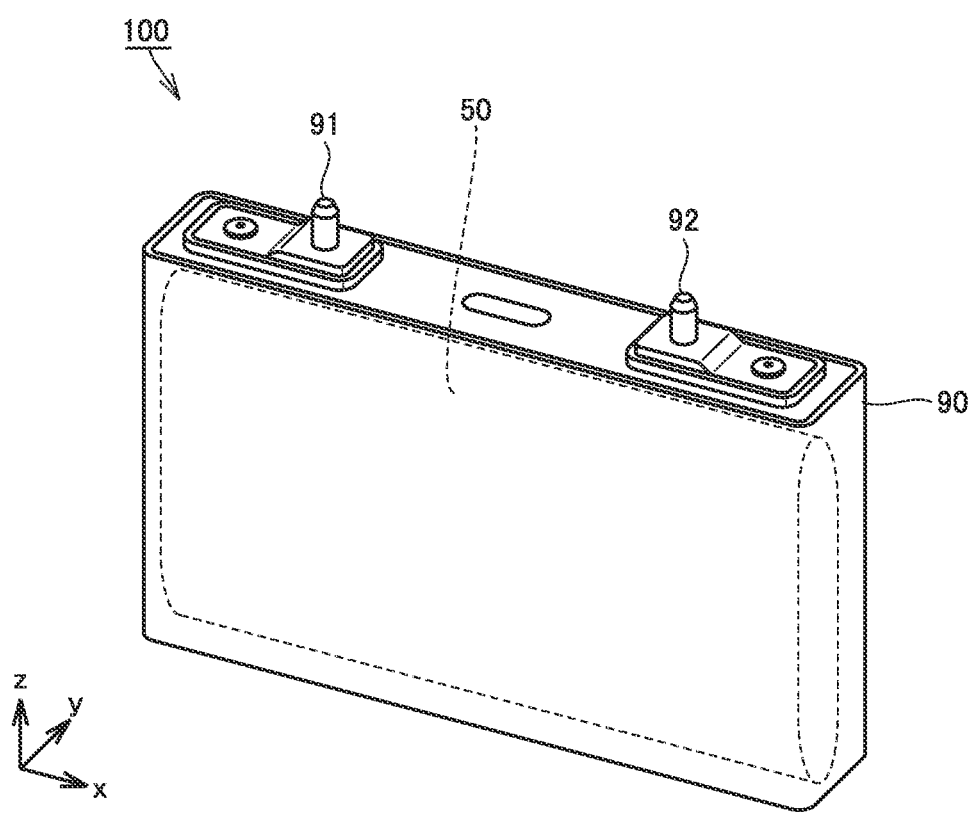
FIG. 5 is a schematic view illustrating the structure of the elementary battery according to the present embodiment.

FIG. 5 is a schematic view illustrating the structure of the elementary battery according to the present embodiment.

Elementary battery 100 is prepared by placing an electrode array 50 and the electrolyte solution in a casing 90. Casing 90 may be made of metal, for example. Casing 90 may be made of an aluminum laminated film, for example. In other words, elementary battery 100 may be a laminate-type battery.

Casing 90 is prismatic (a flat, rectangular parallelepiped). When casing 90 has a prismatic shape, an easy processing can sometimes successfully adjust the amount of pressure applied to gel film 40. Alternatively, casing 90 may be cylindrical.

Casing 90 is equipped with a positive electrode terminal 91 and a negative electrode terminal 92. Each of positive electrode terminal 91 and negative electrode terminal 92 is electrically connected to electrode array 50. Casing 90 may be equipped with a liquid inlet, a gas-discharge valve, and a current interrupt device (CID), for example.

(Electrode Array)

Figure 6:
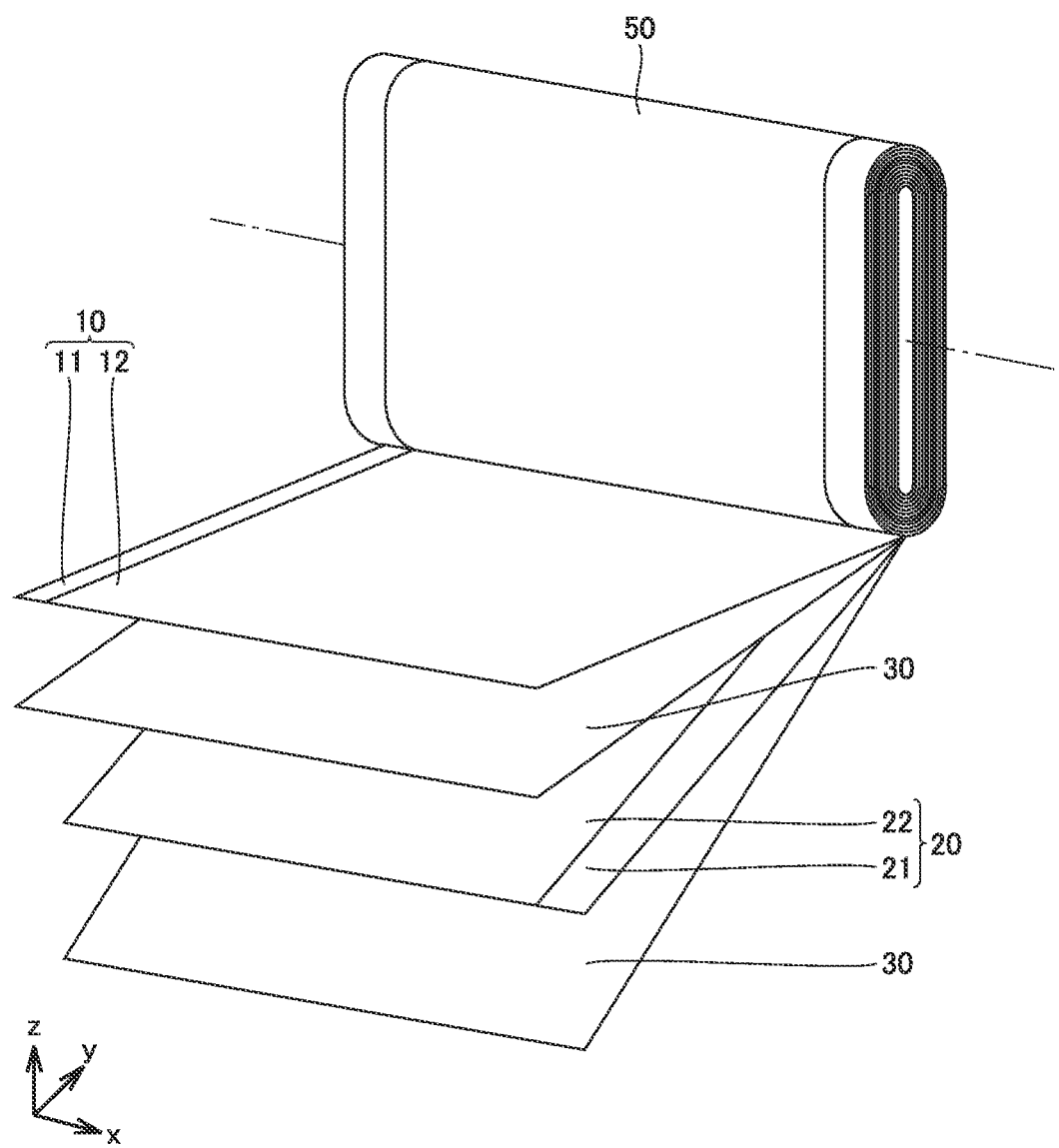
FIG. 6 is a schematic view illustrating the structure of an electrode array according to the present embodiment.

FIG. 6 is a schematic view illustrating the structure of the electrode array according to the present embodiment.

Electrode array 50 includes positive electrode 10, negative electrode 20, gel film 40 (not shown in FIG. 6), and a separator 30. Gel film 40 is formed on a surface of negative electrode 20. Positive electrode 10, negative electrode 20, separator 30, and gel film 40 are impregnated with the electrolyte solution. In other words, elementary battery 100 includes at least positive electrode 10, negative electrode 20, gel film 40, and the electrolyte solution.

Electrode array 50 is a wound-type one. More specifically, electrode array 50 is formed by stacking positive electrode 10, separator 30, negative electrode 20, and separator 30 in this order and then winding them in a spiral fashion. Electrode array 50 may be formed by winding these components into a cylinder and then shaping the resulting cylinder with, for example, a flat press so as to flatten the outer shape of the electrode array. Alternatively, a flat outer shape of electrode array 50 may be obtained at the step of winding.

Electrode array 50 may be a stack-type one. More specifically, electrode array 50 may be formed by alternately stacking one positive electrode 10 and one negative electrode 20 and then repeating this alternate stacking process more than once. In each space between positive electrode 10 and negative electrode 20, separator 30 is interposed.

(Negative Electrode)

Negative electrode 20 is in a sheet form. Negative electrode 20 can be prepared by a variety of methods. The example of the method may be as follows. A surface of a negative electrode current collector 21 may be coated with a paste containing a negative electrode active material, followed by drying to form a negative electrode active material layer 22. Negative electrode active material layer 22 may be formed on both sides of negative electrode current collector 21. By the formation of negative electrode active material layer 22, a raw sheet of negative electrode 20 is obtained. The resulting raw sheet of negative electrode 20 is processed so that predetermined outer dimensions are attained. Thus, negative electrode 20 may be prepared. The processing herein includes compression processing and cutting processing, for example.

Negative electrode current collector 21 is a base material of negative electrode 20. Negative electrode current collector 21 may have a thickness not smaller than 5 μm and not greater than 50 μm, for example. The thickness of each component herein may be measured with a micrometer, for example. The thickness of each component may be measured in, for example, a cross-sectional image observed with a microscope. Thickness measurement is carried out at at least three positions. The arithmetic mean of these at least three measurements is used. Negative electrode current collector 21 may be made of copper (Cu) foil, for example.

Negative electrode active material layer 22 may have a thickness not smaller than 10 μm and not greater than 200 μm, for example. Negative electrode active material layer 22 contains at least the negative electrode active material. In other words, negative electrode 20 includes at least the negative electrode active material. Negative electrode active material layer 22 may further contain a conductive material and a binder, for example, in addition to the negative electrode active material.

The negative electrode active material may be in a particulate form. The negative electrode active material may have a D50 not lower than 1 μm and not higher than 30 μm, for example. The D50 herein is measured by laser diffraction and scattering and refers to the particle size in volume-based particle size distribution at which the cumulative particle volume (accumulated from the side of small sizes) reaches 50% of the total particle volume. It is considered that because negative electrode active material layer 22 has space between the particles, negative electrode active material layer 22 is porous.

The negative electrode active material is not particularly limited. The negative electrode active material may be graphite, soft carbon, hard carbon, silicon, silicon oxide, silicon-based alloy, tin, tin oxide, and/or tin-based alloy, for example. One type of the negative electrode active material may be used alone. Two or more types of the negative electrode active material may be used in combination.

The content of the conductive material may be, for example, not lower than 0.1 part by mass and not higher than 10 parts by mass relative to 100 parts by mass of the negative electrode active material. The conductive material may be acetylene black (AB) and/or carbon fiber, for example. The content of the binder may be, for example, not lower than 0.1 part by mass and not higher than 10 parts by mass relative to 100 parts by mass of the negative electrode active material. The binder may be carboxymethylcellulose (CMC) and/or styrene-butadiene rubber (SBR), for example.

(Gel Film)

Gel film 40 is formed on a surface of negative electrode active material layer 22. In other words, gel film 40 is formed on a surface of negative electrode 20. In some embodiments, gel film 40 covers substantially the entire surface of negative electrode active material layer 22. However, as long as the uniformity of an SEI film 1 can be improved, part of the surface of negative electrode active material layer 22 may be not covered with gel film 40. For example, no gel film 40 may be formed on a part of the surface of negative electrode active material layer 22 that does not face a positive electrode active material layer 12 (described below).

Gel film 40 contains a polymer material and the electrolyte solution. Gel film 40 may be formed by the following method, for example. A dispersion containing the polymer material is applied to a surface of negative electrode active material layer 22 and then dried to form a polymer film. The resulting polymer film is a precursor of gel film 40. The polymer film is impregnated with the electrolyte solution. Thus, gel film 40 may be formed.

(Thixotropy)

Gel film 40 is thixotropic. More specifically, gel film 40 becomes less viscous as the pressure applied thereto increases. Gel film 40 may be converted from gel to sol, for example, as the pressure applied thereto increases.

As the index of thixotropy, a TI value is considered. The TI value of the dispersion of the polymer material is measured. The concentration of the polymer material in the dispersion is set at 0.5 mass %. The solvent contained in the dispersion is a mixed solvent of water and ethanol. The mixing ratio is "water/ethanol=50/50 (volume ratio)". The TI value is calculated by the following expression:

TI value=$(\eta a/\eta b)$ (where each of $\eta a$ and $\eta b$ is a viscosity measured with a B type viscometer at 25° C.; $\eta a$ is a viscosity measured at a rotational speed of 10 rpm; and $\eta b$ is a viscosity measured at a rotational speed of 100 rpm).

The TI value may be not lower than 4.0. When the TI value is not lower than 4.0, it is expected that the cycle capacity retention is improved and an increase in battery resistance is inhibited. The TI value may be not lower than 5.6, for example. The TI value may be not higher than 9.5, for example.

Figure 7:
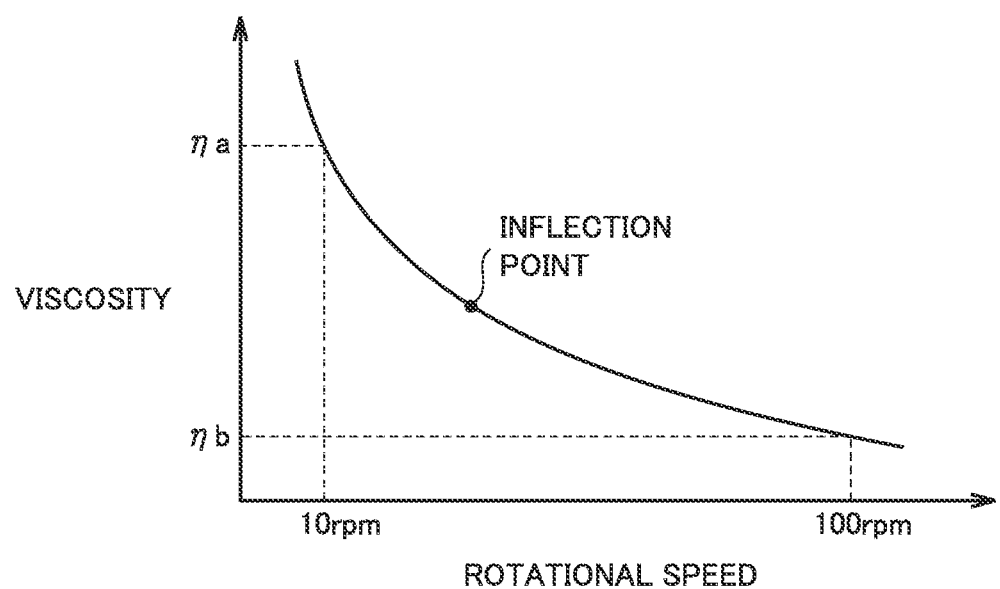
FIG. 7 is a graph illustrating the relationship between the rotational speed of a B type viscometer and the viscosity.

FIG. 7 is a graph illustrating the relationship between the rotational speed of a B type viscometer and the viscosity.

The viscosity of the dispersion of the polymer material according to the present embodiment decreases as the rotational speed of a B type viscometer increases. The rotational speed is regarded as having correlation with the applied pressure. More specifically, an increase of the rotational speed is regarded as an increase of the applied pressure. The curve shown in FIG. 7 has an inflection point. The inflection point may be present between 10 rpm and 100 rpm. When the polymer material has an inflection point at between 10 rpm and 100 rpm, it is expected that the degree of viscosity decrease is great relative to the degree of pressure increase.

Gel film 40 may be converted from gel to sol as the temperature increases, for example. For example, gel film 40 may be in a gel form at a temperature not lower than 0° C. and not higher than 15° C. and may be in a sol form at a temperature not lower than 20° C.

(Polymer Material)

The polymer material may be a polysaccharide, for example. The polysaccharide may have a rod-like molecular shape (namely, may be a chain polymer). A polysaccharide having a rod-like molecular shape tends to have a high TI value. The polymer material may be at least one selected from the group consisting of HPXG, HM-HPMC, HPGG, and CMC, for example.

The polymer material may be at least one selected from the group consisting of HPXG, HM-HPMC, and HPGG. A dispersion containing HPXG, HM-HPMC, and/or HPGG can have a high TI value. Therefore, it is expected that the use of at least one of these polymer materials improves the cycle capacity retention and inhibits an increase in battery resistance.

The content of the polymer material may be, for example, not lower than 0.05 part by mass and not higher than 1.0 part by mass relative to 100 parts by mass of the negative electrode active material. The content of the polymer material may be not lower than 0.1 part by mass and not higher than 0.7 part by mass relative to 100 parts by mass of the negative electrode active material. When the content is within either range, an improved balance is expected to be obtained between the battery resistance and the cycle capacity retention. The content of the polymer material may be not lower than 0.3 part by mass and not higher than 0.5 part by mass relative to 100 parts by mass of the negative electrode active material. When the content is within this range, an improved balance is expected to be obtained between the battery resistance and the cycle capacity retention.

(Positive Electrode)

Positive electrode 10 is in a sheet form. Positive electrode 10 can be prepared by a variety of methods. The example of the method may be as follows. A surface of a positive electrode current collector 11 may be coated with a paste containing a positive electrode active material, followed by drying to form positive electrode active material layer 12. Positive electrode active material layer 12 may be formed on both sides of positive electrode current collector 11. By the formation of positive electrode active material layer 12, a raw sheet of positive electrode 10 is obtained. The resulting raw sheet of positive electrode 10 is processed so that predetermined outer dimensions are attained. Thus, positive electrode 10 may be prepared. The processing herein includes compression processing and cutting processing, for example.

Positive electrode current collector 11 is a base material of positive electrode 10. Positive electrode current collector 11 may have a thickness not smaller than 5 μm and not greater than 50 μm, for example. Positive electrode current collector 11 may be made of aluminum (Al) foil, for example.

Positive electrode active material layer 12 may have a thickness not smaller than 10 μm and not greater than 200 μm, for example. Positive electrode active material layer 12 contains at least the positive electrode active material. In other words, positive electrode 10 contains at least the positive electrode active material. Positive electrode active material layer 12 may further contain a conductive material and a binder, in addition to the positive electrode active material.

The positive electrode active material may be in a particulate form. The positive electrode active material may have a D50 not lower than 1 μm and not higher than 30 μm, for example. It is considered that because positive electrode active material layer 12 has space between the particles, positive electrode active material layer 12 is porous.

The positive electrode active material is not particularly limited. The positive electrode active material may be $LiCoO_2$, $LiNiO_2$, $LiMnO_2$, $LiMn_2O_4$, $LiNi_{1/3}Co_{1/3}Mn_{1/3}O_2$, $LiNi_{0.82}Co_{0.15}Al_{0.03}O_2$, and/or $LiFePO_4$, for example. One type of the positive electrode active material may be used alone. Two or more types of the positive electrode active material may be used in combination.

The content of the conductive material may be, for example, not lower than 1 part by mass and not higher than 10 parts by mass relative to 100 parts by mass of the positive electrode active material. The conductive material is not particularly limited. The conductive material may be AB, for example. The content of the binder may be, for example, not lower than 1 part by mass and not higher than 10 parts by mass relative to 100 parts by mass of the positive electrode active material. The binder may be polyvinylidene difluoride (PVdF), for example.

(Separator)

Separator 30 is interposed between positive electrode 10 and negative electrode 20. Separator 30 is a dielectric porous film. Separator 30 may have a thickness not smaller than 5 μm and not greater than 50 μm, for example. Separator 30 may be made of a polymer material such as polyethylene (PE) and/or polypropylene (PP), for example.

Separator 30 may have a monolayer structure. Separator 30 may consist of a porous PE film, for example. Separator 30 may have a multilayer structure. Separator 30 may be formed by stacking a porous PP film, a porous PE film, and a porous PP film in this order, for example.

Separator 30 may have a heat-resistant layer (not shown) formed on a surface thereof. The heat-resistant layer contains a heat-resistant material. The heat-resistant material may be ceramic particles, for example.

(Electrolyte Solution)

The electrolyte solution is a solution of an electrolyte. The electrolyte solution contains a solvent and a supporting salt. The electrolyte solution may contain the supporting salt in an amount not lower than 0.5 mol/l and not higher than 2 mol/l, for example. The supporting salt may be $LiPF_6$, $LiBF_4$, $Li[N(FSO_2)_2]$, and/or $Li[N(CF_3SO_2)_2]$, for example. One type of the supporting salt may be used alone. Two or more types of the supporting salt may be used in combination.

The solvent may be a mixture of a cyclic carbonate and a chain carbonate, for example. The mixing ratio may be "(cyclic carbonate)/(chain carbonate)=1/9 to 5/5 (volume ratio)", for example. The cyclic carbonate may be ethylene carbonate (EC), propylene carbonate (PC), butylene carbonate (BC), and/or fluoroethylene carbonate (FEC), for example. One type of the cyclic carbonate may be used alone. Two or more types of the cyclic carbonate may be used in combination.

The chain carbonate may be dimethyl carbonate (DMC), ethyl methyl carbonate (EMC), and/or diethyl carbonate (DEC), for example. One type of the chain carbonate may be used alone. Two or more types of the chain carbonate may be used in combination.

The solvent may include a lactone, a cyclic ether, a chain ether, and/or a carboxylic acid ester, for example. The lactone may be γ-butyrolactone (GBL) and/or δ-valerolactone, for example. The cyclic ether may be tetrahydrofuran (THF), 1,3-dioxolane, and/or 1,4-dioxane, for example. The chain ether may be 1,2-dimethoxyethane (DME), for example. The carboxylic acid ester may be methyl formate (MF), methyl acetate (MA), and/or methyl propionate (MP), for example.

The electrolyte solution may further contain various additives in addition to the solvent and the supporting salt. The electrolyte solution may contain the additive or additives in an amount not lower than 0.005 mol/l and not higher than 0.5 mol/l, for example. Examples of the additives include a gas generation agent (anti-overcharging additive) and an agent for promoting formation of SEI film 1. The gas generation agent may be cyclohexylbenzene (CHB) and/or biphenyl (BP), for example. The agent for promoting formation of SEI film 1 may be vinylene carbonate (VC), vinylethylene carbonate (VEC), $Li[B(C_2O_4)_2]$, propane sultone (PS), and/or ethylene sulfite (ES), for example. One type of the additives may be used alone. Two or more types of the additives may be used in combination.

<<(β) Initial Charge>>

The method of producing a non-aqueous electrolyte secondary battery according to the present embodiment includes carrying out initial charge of elementary battery 100.

The initial charge may be carried out with the use of a variety of charge-discharge apparatuses. The initial charge according to the present embodiment may be carried out by a variety of charge controls. The initial charge may be carried out by constant current mode (CC) charging, for example. The initial charge may be carried out by constant voltage mode (CV) charging, for example. The initial charge may be carried out by constant current constant voltage mode (CCCV) charging, for example.

The rate of the initial charge may be not lower than 0.1 C and not higher than 1 C, for example. The "C" refers to the unit of rate. At a rate of "1 C", discharge of elementary battery 100 from the rated capacity completes in one hour. The upper limit to the charging voltage may be not lower than 4 V and not higher than 4.3 V, for example. The upper limit to the charging voltage may be not lower than 4 V and not higher than 4.2 V, for example.

Figure 8:
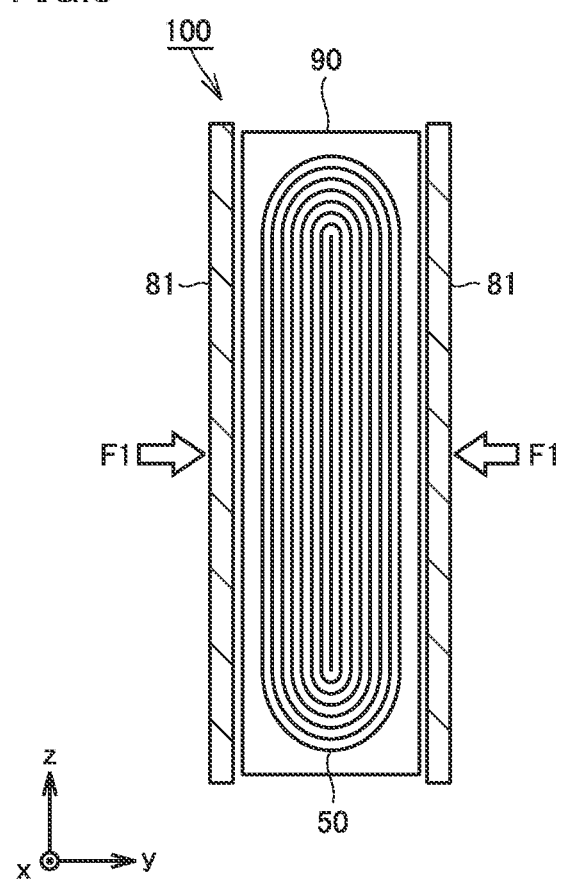
FIG. 8 is a conceptual cross-sectional view that illustrates initial charge.

FIG. 8 is a conceptual cross-sectional view that describes initial charge.

The initial charge is carried out while gel film 40 is under a first pressure. The pressure applied to gel film 40 can be adjusted by changing a force (F1) applied to electrode array 50. Each of the first pressure and a second pressure (described below) herein refers to a value of the force applied to electrode array 50 divided by the area of gel film 40. When no force is applied to electrode array 50, it is regarded that gel film 40 is under atmospheric pressure.

In some embodiments, the first pressure is low. The reason is as follows: it is considered that when the first pressure is low, the viscosity of gel film 40 is high and SEI film 1 is formed uniformly. The first pressure may be substantially the same as atmospheric pressure, for example. However, as long as the first pressure is lower than the second pressure (described below), the first pressure may be higher than atmospheric pressure. Examples of the method for raising the first pressure above atmospheric pressure are considered to be sandwiching elementary battery 100 between two jig plates 81 so as to press elementary battery 100.

It is considered that during the initial charge according to the present embodiment, charge carriers (lithium ions in the present embodiment) reach a surface of negative electrode 20 at a low velocity. The reason is because gel film 40 is formed on a surface of negative electrode 20. It is considered that when charge carriers reach a surface of negative electrode 20 at a low velocity, the velocity of reaction of forming SET film 1 is low. It is considered that this phenomenon may allow SEI film 1 to be formed uniformly.

(Cooling)

The initial charge may be carried out in an environment at room temperature (25° C.±5° C.), for example. The initial charge may be carried out while elementary battery 100 is cooled. It is expected that while elementary battery 100 is cooled, the velocity of charge carriers moving within gel film 40 further decreases. It is expected that this phenomenon leads to an improvement of the cycle capacity retention.

The initial charge of elementary battery 100 may be carried out in a thermostatic chamber with the temperature adjusted to not lower than 0° C. and not higher than 15° C., for example. The temperature refers to a temperature indicated by a thermometer of the thermostatic chamber. In the present embodiment, when elementary battery 100 is placed in an environment at a temperature lower than room temperature, it is regarded that elementary battery 100 is cooled. The initial charge of elementary battery 100 may be carried out in a thermostatic chamber with the temperature adjusted to not lower than 5° C. and not higher than 10° C., for example.

<<(γ) Initial Discharge>>

The method of producing a non-aqueous electrolyte secondary battery according to the present embodiment may include carrying out initial discharge of elementary battery 100 after the initial charge.

The initial discharge may be carried out with the use of a variety of charge-discharge apparatuses. The initial discharge may be carried out by a typical discharge control. The initial discharge may be carried out by constant current mode (CC) discharging, for example. The initial discharge may be carried out by constant voltage mode (CV) discharging, for example. The initial discharge may be carried out by constant current constant voltage mode (CCCV) discharging, for example. The rate of the initial discharge may be not lower than 0.1 C and not higher than 1 C, for example. The lower limit to the discharging voltage may be not lower than 2 V and not higher than 3 V, for example. The lower limit to the discharging voltage may be not lower than 2.5 V and not higher than 3 V, for example.

<<(5) Processing>>

The method of producing a non-aqueous electrolyte secondary battery according to the present embodiment includes processing, after the initial charge, elementary battery 100 to produce a finished-product battery.

Figure 9:
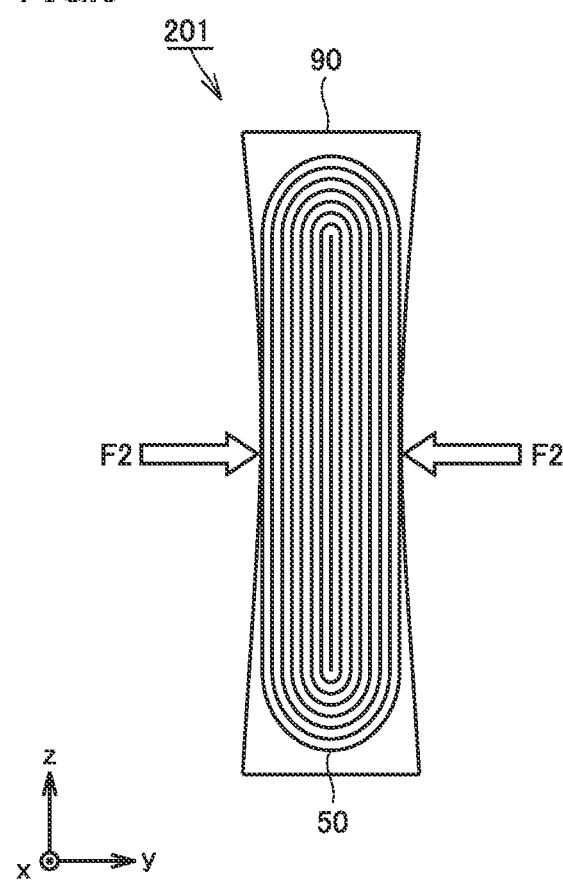
FIG. 9 is a conceptual cross-sectional view showing a first example of the finished-product battery.

FIG. 9 is a conceptual cross-sectional view showing a first example of the finished-product battery.

In the present embodiment, the processing of elementary battery 100 is carried out in such a way that gel film 40 is put under the second pressure. Thus, a first finished-product battery 201 is produced. The second pressure is higher than the first pressure. The processing may be carried out so that a side wall of casing 90 curves inward, for example. In other words, a dimple may be formed on a surface of casing 90. The processing may be carried out so that casing 90 undergoes plastic deformation. It is considered that the curved shape of casing 90 applies a force (F2) to electrode array 50. It is considered that as a result of this phenomenon, gel film 40 is put under the second pressure. In some embodiments, casing 90 of first finished-product battery 201 is made of metal.

It is considered that when gel film 40 is put under the second pressure, the viscosity of gel film 40 decreases. This is because gel film 40 is thixotropic. It is expected that as the viscosity decreases, the velocity of charge carriers moving within gel film 40 increases. In other words, it is expected that an increase in resistance caused by placement of gel film 40 is inhibited.

The second pressure may be not lower than 0.2 MPa and not higher than 2 MPa, for example. The second pressure may be not lower than 0.5 MPa and not higher than 1.5 MPa, for example.

The processing of elementary battery 100 may be carried out before the initial discharge. In some embodiments, the processing of elementary battery 100 is carried out after the initial discharge. The reason is because processing while charging requires attention paid for any short circuit, for example. Discharge is accompanied by electrode shrinkage, and therefore such electrode shrinkage needs to be considered when the second pressure is set.

Figure 10:
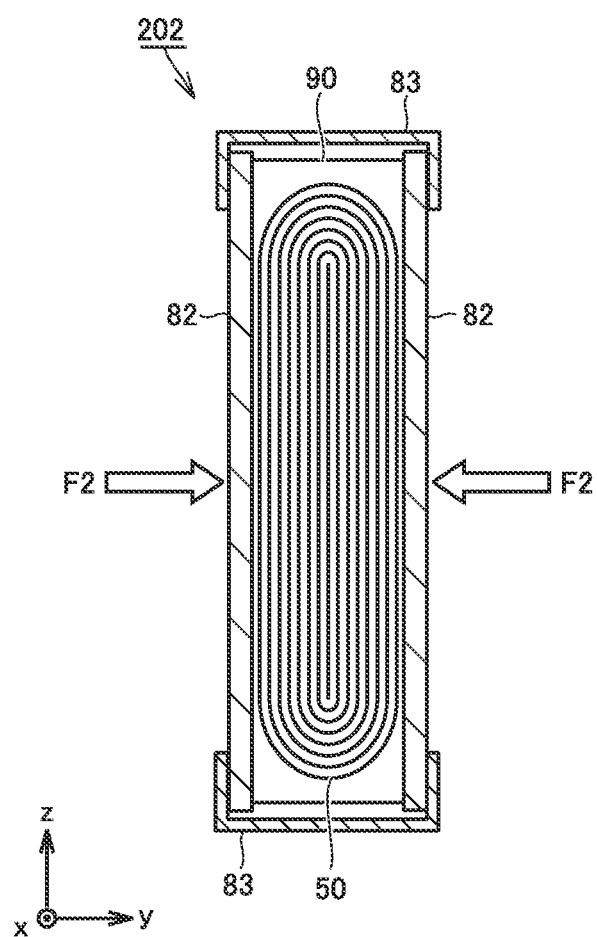
FIG. 10 is a conceptual cross-sectional view showing a second example of the finished-product battery.

FIG. 10 is a conceptual cross-sectional view showing a second example of the finished-product battery.

A component for applying pressure to gel film 40 may be provided to elementary battery 100, for example. Thus, a second finished-product battery 202 is produced. Second finished-product battery 202 includes elementary battery 100, at least one plate 82, and a restraint band 83. At least one plate 82 and restraint band 83 are components for applying pressure to gel film 40. Elementary battery 100 is interposed between two plates 82. Restraint band 83 holds two plates 82. It is considered that in this arrangement, plates 82 press casing 90 and a force (F2) is applied to electrode array 50. It is considered that because of this phenomenon, pressure is applied to gel film 40. In other words, it is considered that gel film 40 is put under the second pressure.

(Battery Pack)

Figure 11:
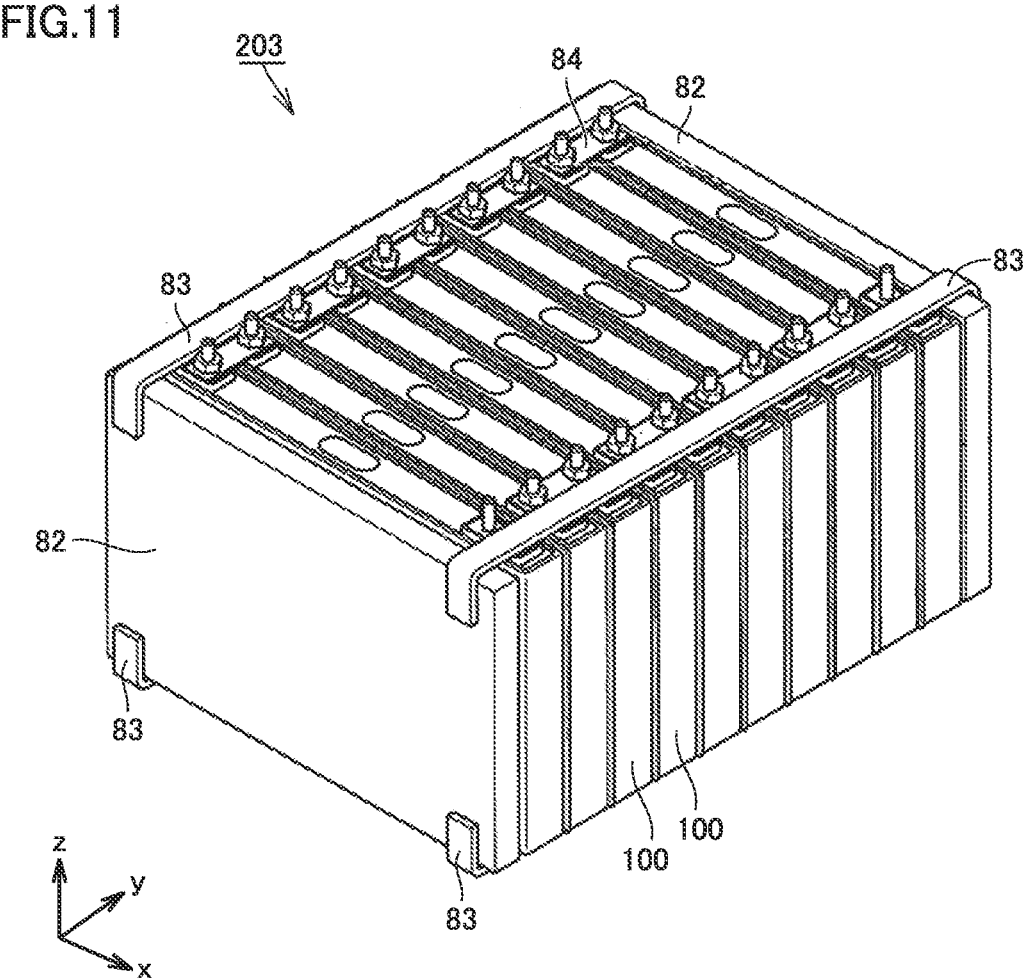
FIG. 11 is a schematic view showing a third example of the finished-product battery.

FIG. 11 is a schematic view showing a third example of the finished-product battery.

The method of producing a non-aqueous electrolyte secondary battery according to the present embodiment can also produce a battery pack. In other words, the present embodiment also provides a method of producing a battery pack.

A third finished-product battery 203 is a battery pack. Third finished-product battery 203 includes a plurality of elementary batteries 100. The plurality of elementary batteries 100 are aligned in the Y-axis direction. Adjacent elementary batteries 100 are electrically connected to each other via a bus bar 84. A resin plate or the like may be interposed between adjacent elementary batteries 100. On each end in the Y-axis direction, one plate 82 is placed. Restraint band 83 holds two plates 82. It is considered that in this arrangement, pressure is applied to gel film 40 in each of the plurality of elementary batteries 100. In other words, it is considered that gel film 40 is put under the second pressure.

EXAMPLES

In the following, examples according to the present disclosure are described. The scope of claims is not limited to the following description.

Example 1

<<(α) Preparation of Elementary Battery>>

I. Preparation of Negative Electrode

The following materials were prepared:

Negative electrode active material: graphite;

Binder: CMC and SBR;

Solvent: water, and

Negative electrode current collector 21: Cu foil (thickness, 10 μm).

The negative electrode active material, the binder, and the solvent were mixed to prepare a paste. The content of each of CMC and SBR in the resulting paste is 1 part by mass relative to 100 parts by mass of the negative electrode active material. The paste was applied to the surface (both sides) of negative electrode current collector 21 and then dried to form negative electrode active material layer 22. Thus, a raw sheet of negative electrode 20 was prepared.

2. Formation of Polymer Film

The following materials were prepared:

Polymer material: hydroxypropyl xanthan gum (HPXG); and

Solvent: mixed solvent of water and ethanol [water/ethanol=50/50 (volume ratio)].

The polymer material and the solvent were mixed to prepare a dispersion. The resulting dispersion was applied to a surface of negative electrode active material layer 22 and then dried to form a polymer film. The resulting polymer film is a precursor of gel film 40. The content of the polymer material is 0.3 part by mass relative to 100 parts by mass of the negative electrode active material. After the formation of the polymer film, the raw sheet of negative electrode 20 was processed so that predetermined outer dimensions were attained. Thus, negative electrode 20 was prepared.

3. Preparation of Positive Electrode

The following materials were prepared:

Positive electrode active material: $LiNi_{1/3}Co_{1/3}Mn_{1/3}O_2$;

Conductive Material: AB;

Binder: PVdF;

Solvent: NMP; and

Positive electrode current collector 11: Al foil (thickness, 20 μm).

The positive electrode active material, the conductive material, the binder, and the solvent were mixed to prepare a paste. The content of the conductive material in the resulting paste is 8 parts by mass relative to 100 parts by mass of the positive electrode active material. The content of the binder is 2 parts by mass relative to 100 parts by mass of the positive electrode active material. The paste was applied to the surface (both sides) of positive electrode current collector 11 and then dried to form positive electrode active material layer 12. Thus, a raw sheet of positive electrode 10 was prepared. The resulting raw sheet was processed so that predetermined outer dimensions were attained. Thus, positive electrode 10 was prepared.

4. Preparation of Separator

A porous film was prepared. The porous film was made of PE. Ceramic particles, a binder, and a solvent were mixed to prepare a paste. The resulting paste was applied to a surface (one side) of the porous film and then dried to form a heat-resistant layer. Thus, separator 30 was prepared.

5. Formation of Electrode Array

Positive electrode 10, separator 30, negative electrode 20, and separator 30 were stacked in this order and then wound in a spiral fashion to form electrode array 50. The outer shape of electrode array 50 thus formed was flat. Separator 30 was positioned so that the heat-resistant layer faced negative electrode 20.

6. Assembling

Casing 90 was prepared. In casing 90, electrode array 50 was placed. An electrolyte solution was prepared. The electrolyte solution contained a solvent and a supporting salt specified below:

Solvent: [EC/DMC/EMC=30/35/35 (volume ratio)]; and

Supporting salt: $LiPF_6$ (1 mol/l).

The electrolyte solution was injected into casing 90. Casing 90 was hermetically sealed. Thus, elementary battery 100 was prepared. Elementary battery 100 is a lithium-ion secondary battery. Elementary battery 100 has a rated capacity of 4 Ah. It is considered that inside elementary battery 100, the polymer film was impregnated with the electrolyte solution and, as a result, gel film 40 was formed.

<<(β) Initial Charge>>

Elementary battery 100 was placed in a thermostatic chamber. The temperature of the thermostatic chamber was set at 10° C. Initial charge of elementary battery 100 was carried out by CCCV charging specified below. In other words, the initial charge was carried out while elementary battery 100 was cooled. During the initial charge, elementary battery 100 received no external force. In other words, the initial charge was carried out while gel film 40 was under atmospheric pressure (first pressure). In Table 1 below, atmospheric pressure is expressed as "0.1 MPa".

CCCV Charging: rate in constant-current charging=0.5 C, voltage in constant-voltage charging=4.1 V <<(γ) Initial Discharge>>

After the initial charge, initial discharge of elementary battery 100 was carried out by CCCV discharging specified below. The initial discharge was also carried out in a thermostatic chamber set at 10° C. The initial discharge capacity is divided by the initial charge capacity, and thus an initial efficiency was calculated. Results are shown in Table 1 below.

CCCV Discharging: rate in constant-current discharging=0.5 C, voltage in constant-voltage discharging=3 V <<(δ) Processing>>

After the discharge, elementary battery 100 was interposed between two plates 82. To two plates 82, restraint band 83 was attached so that two plates 82 pressed elementary battery 100. It is considered that in this arrangement, gel film 40 was put under the second pressure. In other words, processing of elementary battery 100 was carried out in such a way that gel film 40 was put under the second pressure.

Attaching restraint band 83 was carried out so that the second pressure was 1 MPa. In other words, the second pressure was higher than the first pressure (atmospheric pressure). Thus, a finished-product battery was produced. The resulting finished-product battery was a lithium-ion secondary battery.

Examples 2 to 4, 8, and 9

A finished-product battery was produced in the same manner as in Example 1 except that the content of the polymer material was changed as specified in Table 1 below.

Examples 5 and 6

A finished-product battery was produced in the same manner as in Examples 1 and 2, respectively, except that the polymer material used was hydrophobically-modified hydroxypropyl methylcellulose (HM-HPMC), in place of HPXG, as specified in Table 1 below.

Example 7

A finished-product battery was produced in the same manner as in Example 1 except that the polymer material used was hydroxypropyl guar gum (HPGG), in place of HPXG, as specified in Table 1 below.

Example 10

A finished-product battery was produced in the same manner as in Example 1 except that initial charge was carried out at 25° C. Example 10 is an example in which elementary battery 100 was not cooled during initial charge.

Example 11

A finished-product battery was produced in the same manner as in Example 1 except that the polymer material used was carboxymethylcellulose (CMC), in place of HPXG, as specified in Table 1 below.

Comparative Example 1

A finished-product battery was produced in the same manner as in Example 1 except that no gel film 40 was formed on a surface of negative electrode 20.

Comparative Example 2

The negative electrode active material, the binder, the polymer material (HPXG), and the solvent were mixed to prepare a paste. The resulting paste was applied to the surface (both sides) of negative electrode current collector 21 and then dried to form negative electrode active material layer 22. Except for these conditions, the same manner as in Example 1 was adopted and a finished-product battery was produced. It is considered that in Comparative Example 2, gel film 40 was formed and dispersed within negative electrode 20 (negative electrode active material layer 22).

Comparative Example 3

In Comparative Example 3, initial charge was carried out while gel film 40 was under a pressure of 1 MPa. In Comparative Example 3, elementary battery 100 was not processed after initial discharge and the resulting non-processed elementary battery 100 was regarded as a finished-product battery. In Comparative Example 3, the first pressure was 1 MPa and the second pressure was 0.1 MPa.

Comparative Example 4

In Comparative Example 4, elementary battery 100 was not processed after initial discharge and the resulting non-processed elementary battery 100 was regarded as a finished-product battery.

seconds. The amount of voltage increased in 10 seconds from the start of charging was measured. This amount of voltage increase was divided by the amount of current, and thus a battery resistance was calculated. Results are shown in Table 1 below.

2. Measurement of Cycle Capacity Retention at 25° C.

The finished-product battery was placed in a thermostatic chamber. The temperature of the thermostatic chamber was set at 25° C. Charge-discharge cycles were repeated 1000 times (1000 cycles). In a single cycle, a single set of CCCV charging and CC discharging described below was carried out.

CCCV Charging: rate in constant-current charging=1 C, voltage in constant-voltage charging=4.1 V CC Discharging: rate=1 C, cut-off voltage=3 V After 1000 cycles, a post-cycle discharge capacity was measured under the same conditions as those in the initial charge and discharge. This post-cycle discharge capacity was divided by the initial discharge capacity, and thus a cycle capacity retention was calculated. Results are shown in Table 1 below.

TABLE 1

List of Examples and Comparative Examples

| | (α) Preparation of elementary battery | | | | (β) Initial charge | | (γ) Initial discharge | (δ) Processing | Evaluation of finished-product battery | |
|---|---|---|---|---|---|---|---|---|---|---|
| | | Polymer material (gel film) | | | | | | | | Cycle capacity retention at 25° C. % |
| | Arrangement | Type*[1] | TI value*[2] dimensionless | Cont. parts by mass | 1st pressure MPa | Temp. ° C. | Initial efficiency % | 2nd pressure MPa | Battery resistance mΩ | |
| Ex. 1 | Surface | HPXG | 9.5 | 0.3 | 0.1 | 10 | 97 | 1 | 4.1 | 95 |
| Ex. 2 | Surface | HPXG | 9.5 | 0.5 | 0.1 | 10 | 95 | 1 | 4.3 | 92 |
| Ex. 3 | Surface | HPXG | 9.5 | 0.7 | 0.1 | 10 | 92 | 1 | 4.2 | 90 |
| Ex. 4 | Surface | HPXG | 9.5 | 0.1 | 0.1 | 10 | 96 | 1 | 4.0 | 93 |
| Ex. 5 | Surface | HM-HPMC | 5.6 | 0.3 | 0.1 | 10 | 93 | 1 | 4.3 | 91 |
| Ex. 6 | Surface | HM-HPMC | 5.6 | 0.5 | 0.1 | 10 | 94 | 1 | 4.5 | 92 |
| Ex. 7 | Surface | HPGG | 4.0 | 0.3 | 0.1 | 10 | 91 | 1 | 4.6 | 90 |
| Ex. 8 | Surface | HPXG | 9.5 | 1.0 | 0.1 | 10 | 90 | 1 | 5.3 | 91 |
| Ex. 9 | Surface | HPXG | 9.5 | 0.05 | 0.1 | 10 | 89 | 1 | 3.9 | 86 |
| Ex. 10 | Surface | HPXG | 9.5 | 0.3 | 0.1 | 25 | 87 | 1 | 4.4 | 83 |
| Ex. 11 | Surface | CMC | 3.1 | 0.3 | 0.1 | 10 | 90 | 1 | 5.3 | 92 |
| Comp. Ex. 1 | — | None | — | — | 0.1 | 25 | 82 | 1 | 4.3 | 78 |
| Comp. Ex. 2 | Inside | HPXG | 9.5 | 0.3 | 0.1 | 10 | 78 | 1 | 5.5 | 76 |
| Comp. Ex. 3 | Surface | HPXG | 9.5 | 0.3 | 1 (pressed) | 25 | 83 | 0.1 (No processing) | 6.5 | 75 |
| Comp. Ex. 4 | Surface | HPXG | 9.5 | 0.3 | 0.1 | 25 | 85 | 0.1 (No processing) | 6.2 | 77 |

*[1]HPXG: hydroxypropyl xanthan gum HM-HPMC: hydrophobically-modified hydroxypropyl methylcellulose HPGG: hydroxypropyl guar gum CMC: carboxymethylcellulose
*[2]TI value = (ηa/ηb)

<Measurement of TI Value>

By the method described above, the TI value of the dispersion of each polymer material was measured. Results are shown in Table 1 below.

<Evaluation of Finished-Product Battery>

1. Measurement of Battery Resistance

CCCV charging was carried out to adjust the voltage of the finished-product battery to 3.7 V. The finished-product battery was placed in a thermostatic chamber. The temperature of the thermostatic chamber was set at 25° C. The finished-product battery was charged at a rate of 2 C for 10

Results

In Examples 1 to 11, compared to Comparative Example 1, the cycle capacity retention is high. In the examples according to the present disclosure, initial charge is carried out by a typical charge control. It is therefore considered that in Examples 1 to 11, cycle capacity retention is successfully improved without a complex charge control.

In Comparative Example 1, no gel film 40 is formed on a surface of negative electrode 20. In Examples 1 to 11, gel film 40 is formed on a surface of negative electrode 20. It is considered that in Examples 1 to 11, the presence of gel film 40 maintains the velocity of reaction of forming SEI film 1 at a low velocity and thereby SEI film 1 has an improved uniformity.

In Comparative Example 2, gel film 40 is formed inside negative electrode 20 (negative electrode active material layer 22). In Comparative Example 2, the cycle capacity retention is low. It is considered that the reaction of forming SEI film 1 takes place preferentially on a surface of negative electrode 20 near positive electrode 10. It is therefore considered to be difficult to improve uniformity of SEI film 1 by forming gel film 40 inside negative electrode 20.

From results in Examples 1 and 10, a tendency is observed that the cycle capacity retention is improved when elementary battery 100 is cooled during initial charge. The reason is considered to be that while the elementary battery is cooled, the velocity of charge carriers moving within gel film 40 further decreases.

From results in Examples 1, 5, 7, and 11, a tendency is observed that when the TI value is not lower than 4.0, the cycle capacity retention is improved and an increase in battery resistance is inhibited. Here, a TI value not lower than 4.0 is obtained for each of HPXG, HM-HPMC, and HPGG.

From results in Examples 1 to 4, 8, and 9, a tendency is observed that when the content of the polymer material is not lower than 0.1 part by mass and not higher than 0.7 part by mass, an improved balance is obtained between the battery resistance and the cycle capacity retention. A tendency is observed that when the content of the polymer material is not lower than 0.3 part by mass and not higher than 0.5 part by mass, an improved balance is obtained between the battery resistance and the cycle capacity retention.

The embodiments and examples disclosed herein are illustrative and non-restrictive in any respect. The technical scope indicated by the claims is intended to include any modifications within the scope and meaning equivalent to the terms of the claims.

What is claimed is:

1. A method of producing a non-aqueous electrolyte secondary battery, comprising at least:
    preparing an elementary battery including at least a positive electrode, a negative electrode, a gel film, and an electrolyte solution;
    carrying out initial charge of the elementary battery while the elementary battery is cooled; and
    after the initial charge, processing the elementary battery to produce a finished-product battery,
    the negative electrode including at least a negative electrode active material,
    the gel film being formed on a surface of the negative electrode,
    the gel film containing a polymer material and the electrolyte solution,
    the gel film is thixotropic,
    the initial charge being carried out while the gel film is under a first pressure,
    the processing of the elementary battery being carried out in such a way that the gel film is put under a second pressure,
    the second pressure being higher than the first pressure.
2. The method of producing a non-aqueous electrolyte secondary battery according to claim 1, wherein a dispersion containing the polymer material in an amount of 0.5 mass % with the remainder being made up of a solvent satisfies the following relationship:

$$(\eta a/\eta b) \geq 4.0$$

where each of $\eta a$ and $\eta b$ is a viscosity measured with a B type viscometer at 25° C.; $\eta a$ is a viscosity measured at a rotational speed of 10 rpm; and $\eta b$ is a viscosity measured at a rotational speed of 100 rpm.
3. The method of producing a non-aqueous electrolyte secondary battery according to claim 1, wherein the polymer material is at least one selected from the group consisting of hydroxypropyl xanthan gum, hydrophobically-modified hydroxypropyl methylcellulose, and hydroxypropyl guar gum.
4. The method of producing a non-aqueous electrolyte secondary battery according to claim 1, wherein a content of the polymer material is not lower than 0.1 part by mass and not higher than 0.7 part by mass relative to 100 parts by mass of the negative electrode active material.
5. A method of producing a non-aqueous electrolyte secondary battery, comprising at least:
    preparing an elementary battery including at least a positive electrode, a negative electrode, a gel film, and an electrolyte solution;
    carrying out initial charge of the elementary battery; and
    after the initial charge, processing the elementary battery to produce a finished-product battery,
    the negative electrode including at least a negative electrode active material,
    the gel film being formed on a surface of the negative electrode,
    the gel film containing a polymer material and the electrolyte solution,
    the gel film is thixotropic,
    the initial charge being carried out while the gel film is under a first pressure,
    the processing of the elementary battery being carried out in such a way that the gel film is put under a second pressure,
    the second pressure being higher than the first pressure, and
    the polymer material is at least one selected from the group consisting of hydroxypropyl xanthan gum, hydrophobically-modified hydroxypropyl methylcellulose, and hydroxypropyl guar gum.
6. The method of producing a non-aqueous electrolyte secondary battery according to claim 5, wherein the initial charge is carried out while the elementary battery is cooled.
7. The method of producing a non-aqueous electrolyte secondary battery according to claim 5, wherein a dispersion containing the polymer material in an amount of 0.5 mass % with the remainder being made up of a solvent satisfies the following relationship:

$$(\eta a/\eta b) \geq 4.0$$

where each of $\eta a$ and $\eta b$ is a viscosity measured with a B type viscometer at 25° C.; $\eta a$ is a viscosity measured at a rotational speed of 10 rpm; and $\eta b$ is a viscosity measured at a rotational speed of 100 rpm.
8. The method of producing a non-aqueous electrolyte secondary battery according to claim 5, wherein a content of the polymer material is not lower than 0.1 part by mass and not higher than 0.7 part by mass relative to 100 parts by mass of the negative electrode active material.

* * * * *

UNITED STATES PATENT AND TRADEMARK OFFICE
CERTIFICATE OF CORRECTION

PATENT NO. : 10,886,522 B2
APPLICATION NO. : 16/195183
DATED : January 5, 2021
INVENTOR(S) : Atsushi Sugihara and Naoto Onodera It is certified that error appears in the above-identified patent and that said Letters Patent is hereby corrected as shown below:

In the Specification

In Column 2, Line(s) 63, after "processed", delete "m" and insert --in--, therefor.

In Column 11, Line(s) 15, delete "5" and insert --δ--, therefor.

Signed and Sealed this
Thirteenth Day of April, 2021

Drew Hirshfeld
*Performing the Functions and Duties of the*
*Under Secretary of Commerce for Intellectual Property and*
*Director of the United States Patent and Trademark Office*